(12) United States Patent
Takahashi et al.

(10) Patent No.: US 10,335,678 B2
(45) Date of Patent: Jul. 2, 2019

(54) GAME PROGRAM AND INFORMATION PROCESSING DEVICE

(71) Applicant: DeNA Co., Ltd., Tokyo (JP)

(72) Inventors: Kenichi Takahashi, Tokyo (JP); Miyako Shoji, Tokyo (JP); Shiina Suzuki, Tokyo (JP)

(73) Assignee: DENA CO., LTD., Tokyo (JP)

( * ) Notice: Subject to any disclaimer, the term of this patent is extended or adjusted under 35 U.S.C. 154(b) by 773 days.

(21) Appl. No.: 14/863,244

(22) Filed: Sep. 23, 2015

(65) Prior Publication Data

US 2016/0124518 A1 May 5, 2016

(30) Foreign Application Priority Data

Nov. 5, 2014 (JP) .................................. 2014-224943

(51) Int. Cl.
*G06F 3/038* (2013.01)
*A63F 13/23* (2014.01)
(Continued)

(52) U.S. Cl.
CPC .......... *A63F 13/44* (2014.09); *A63F 13/2145* (2014.09); *A63F 13/426* (2014.09);
(Continued)

(58) Field of Classification Search
CPC .... A63F 13/44; A63F 13/2145; A63F 13/426; A63F 13/822; A63F 13/69;
(Continued)

(56) References Cited

U.S. PATENT DOCUMENTS 5,340,061 A * 8/1994 Vaquier ................ G08G 5/0021
244/175
5,714,972 A * 2/1998 Tanaka .................. G06F 1/1626
345/156
(Continued)

FOREIGN PATENT DOCUMENTS

JP 2009-18202 1/2009
JP 2011-062418 A * 3/2011 ............. A63F 13/10
(Continued)

OTHER PUBLICATIONS

Machine translation of JP 2011-206444 A, downloaded from https://www4.j-platpat.inpit.go.jp, Mar. 19, 2018.*
(Continued)

*Primary Examiner* — David L Lewis
*Assistant Examiner* — Matthew D Hoel
(74) *Attorney, Agent, or Firm* — Procopio, Cory, Hargreaves & Savitch LLP

(57) ABSTRACT

A screen generation process is provided that generates a game screen having disposed thereon multiple selectable objects that a player is allowed to select; an acceptance process that accepts the selection operation input on said selectable objects when the pointing location initially arrives at the location of a selectable object disposed on the game screen while the movement of the pointing location on the game screen is maintained by the player's operations, and said acceptance process accepts the selection operation input in a sequential manner, starting with the selectable object at which the pointing location arrives the earliest; and a special effect generation process that generates special effects in the course of a game driven by the player's operations based on the moment when the pointing location initially arrives at the location of the selectable object, and/or the order of acceptance of the selection operation input on the selectable objects.

6 Claims, 11 Drawing Sheets

(51) Int. Cl.
  *A63F 13/44* (2014.01)
  *G06F 3/0484* (2013.01)
  *G06F 3/0488* (2013.01)
  *A63F 13/426* (2014.01)
  *A63F 13/2145* (2014.01)
  *A63F 13/822* (2014.01)
  *G06F 3/0481* (2013.01)
  *A63F 13/69* (2014.01)

(52) U.S. Cl.
  CPC ........ *A63F 13/822* (2014.09); *G06F 3/04817* (2013.01); *G06F 3/04842* (2013.01); *G06F 3/04883* (2013.01); *G06F 3/04886* (2013.01); *A63F 13/69* (2014.09)

(58) Field of Classification Search
  CPC ............. G06F 3/04817; G06F 3/04842; G06F 3/04883; G06F 3/04886
  See application file for complete search history.

(56) References Cited

U.S. PATENT DOCUMENTS

| | | | | |
|---|---|---|---|---|
| 7,637,813 | B2* | 12/2009 | Katayama | A63F 13/10 463/31 |
| 8,167,692 | B2* | 5/2012 | Katayama | A63F 13/10 463/1 |
| 8,328,610 | B2* | 12/2012 | Shimura | A63F 13/10 463/42 |
| 8,423,912 | B2* | 4/2013 | Irani | G06F 3/0482 715/811 |
| 8,702,513 | B2* | 4/2014 | Lim | G06F 3/03547 463/31 |
| 8,845,430 | B2* | 9/2014 | Hayashi | A63F 13/20 463/31 |
| 8,894,489 | B2* | 11/2014 | Lim | G06F 3/03547 463/31 |
| 9,164,674 | B2* | 10/2015 | Ng | G06F 3/0488 |
| 9,283,473 | B2* | 3/2016 | Tagawa | A63F 13/06 |
| 9,308,456 | B2* | 4/2016 | Derome | A63F 9/24 |
| 9,713,772 | B2* | 7/2017 | Frostberg | A63F 13/822 |
| 9,724,607 | B2* | 8/2017 | Frostberg | A63F 13/537 |
| 9,757,646 | B2* | 9/2017 | Dumitrescu | A63F 13/2145 |
| 9,795,889 | B2* | 10/2017 | Suga | A63F 13/537 |
| 9,808,719 | B2* | 11/2017 | Yamaguchi | A63F 13/69 |
| 9,830,765 | B2* | 11/2017 | Derome | A63F 9/24 |
| 9,861,891 | B2* | 1/2018 | Kunugi | A63F 13/35 |
| 9,901,817 | B2* | 2/2018 | Yamaguchi | A63F 13/42 |
| 2001/0026265 | A1* | 10/2001 | Kikuchi | A63F 13/10 345/157 |
| 2004/0176163 | A1* | 9/2004 | Ishihata | A63F 13/10 463/30 |
| 2005/0162402 | A1* | 7/2005 | Watanachote | G06F 3/03547 345/173 |
| 2005/0164784 | A1* | 7/2005 | Yamamoto | A63F 13/10 463/30 |
| 2005/0176486 | A1* | 8/2005 | Nishimura | A63F 13/10 463/4 |
| 2006/0089197 | A1* | 4/2006 | Ajioka | A63F 13/06 463/31 |
| 2006/0109259 | A1* | 5/2006 | Ohta | G06F 3/0485 345/173 |
| 2008/0313538 | A1* | 12/2008 | Hudson | G06F 3/04886 715/702 |
| 2011/0124400 | A1* | 5/2011 | Scholtz | G07F 17/32 463/25 |
| 2011/0212775 | A1* | 9/2011 | Sano | A63F 13/426 463/31 |
| 2011/0285636 | A1* | 11/2011 | Howard | G06F 3/04815 345/173 |
| 2012/0007882 | A1* | 1/2012 | Sakurai | G06F 3/04815 345/619 |
| 2012/0327106 | A1* | 12/2012 | Won | G06F 3/04883 345/619 |
| 2013/0074013 | A1* | 3/2013 | Tapiola | G06F 3/04883 715/859 |
| 2013/0316813 | A1* | 11/2013 | Derome | A63F 9/24 463/31 |
| 2014/0121012 | A1* | 5/2014 | Tagawa | A63F 13/06 463/31 |
| 2015/0024783 | A1* | 1/2015 | Konno | A63F 13/30 455/456.3 |
| 2015/0094127 | A1* | 4/2015 | Canose | A63F 13/42 463/2 |
| 2015/0106857 | A1* | 4/2015 | Karaoguz | G06F 3/0304 725/61 |
| 2015/0113477 | A1* | 4/2015 | Haussila | G06F 3/04847 715/810 |
| 2015/0151204 | A1* | 6/2015 | Yamaguchi | A63F 13/825 463/31 |
| 2016/0089602 | A1* | 3/2016 | Frostberg | A63F 13/822 463/31 |
| 2016/0089603 | A1* | 3/2016 | Frostberg | A63F 13/537 463/31 |
| 2016/0124518 | A1* | 5/2016 | Takahashi | G06F 3/04842 463/31 |
| 2016/0139773 | A1* | 5/2016 | Kodisoja | A63F 13/80 463/33 |
| 2016/0271491 | A1* | 9/2016 | Yamaguchi | A63F 13/42 |
| 2017/0282071 | A1* | 10/2017 | Kurabayashi | H04N 5/765 |

FOREIGN PATENT DOCUMENTS

| | | | | |
|---|---|---|---|---|
| JP | 2011-177204 A | * | 9/2011 | ........... A63F 14/426 |
| JP | 2011-206444 | | 10/2011 | |
| JP | 2011-206444 A | * | 10/2011 | ............. A63F 13/42 |
| JP | 2015-000331 A | * | 1/2015 | ........... A63F 13/422 |
| JP | 2015-066208 A | * | 4/2015 | ............. A63F 13/58 |

OTHER PUBLICATIONS

Machine translation of JP 2011-062418 A, downloaded from https://www4.j-platpat.inpit.go.jp, Mar. 22, 2019.*
Machine translation of JP 2015-000331 A, downloaded from https://www4.j-platpat.inpit.go.jp, Mar. 22, 2019.*
Machine translation of JP 2015-066208 A, downloaded from https://www4.j-platpat.inpit.go.jp, Mar. 22, 2019.*
Machine translation of JP 2011-177204 A, downloaded from https://www4.j-platpat.inpit.go.jp, Mar. 22, 2019.*
Machine translation of JP 2011-206444 A, downloaded from https://www4.j-platpat.inpit.go.jp, Mar. 22, 2019.*
Japanese Patent Application No. 2014-224943:Decision to Grant dated Mar. 31, 2015.
Japanese Patent Application No. 2014-224943:Office Action dated Feb. 10, 2015.

* cited by examiner

| Item ID | Item Name |
|---------|-----------|
| 0001 | Item A |
| 0002 | Item B |
| 0003 | Item C |
| ⋮ | ⋮ |

FIG. 3

| Character ID | Character Name | Character Image | Rarity | Initial Attack Strength | Upper Attack Strength Limit | Initial Defense Strength | Upper Defense Strength Limit | Initial Hit Points | Upper Hit Points Limit | Skill | Attack Frequency | Standby Time | Attribute |
|---|---|---|---|---|---|---|---|---|---|---|---|---|---|
| 0001 | Character A | | Common | 15 | 100 | 8 | 100 | 10 | 100 | Skill A | 5 | 3 seconds | Fire |
| 0002 | Character B | | Uncommon | 30 | 300 | 20 | 300 | 15 | 300 | Skill B | 2 | 2 seconds | Water |
| 0003 | Character C | | Rare | 45 | 600 | 30 | 600 | 25 | 600 | Skill C | 3 | 10 seconds | Wind |
| 0004 | Character D | | Super-rare | 60 | 1000 | 55 | 1000 | 60 | 1000 | Skill D | 1 | 7 seconds | Earth |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 4

| Player ID | Player Name | Level | Proprietary Item Information | Proprietary Character Information | Deck Information | Game Progress Information |
|---|---|---|---|---|---|---|
| 1 | A | 20 | Proprietary Item Information (1) | Proprietary Character Information (1) | Deck Information (1) | Game Progress Information (1) |
| 2 | B | 12 | Proprietary Item Information (2) | Proprietary Character Information (2) | Deck Information (2) | Game Progress Information (2) |
| 3 | C | 31 | Proprietary Item Information (3) | Proprietary Character Information (3) | Deck Information (3) | Game Progress Information (3) |
| 4 | D | 18 | Proprietary Item Information (4) | Proprietary Character Information (4) | Deck Information (4) | Game Progress Information (4) |
| 5 | E | 100 | Proprietary Item Information (5) | Proprietary Character Information (5) | Deck Information (5) | Game Progress Information (5) |
| 6 | F | 85 | Proprietary Item Information (6) | Proprietary Character Information (6) | Deck Information (6) | Game Progress Information (6) |
| . | . | . | . | . | . | . |
| . | . | . | . | . | . | . |

FIG. 5

Proprietary Item Information (3)
Proprietary Item Information (2)

| Proprietary Item Information (1) ||
|---|---|
| Item ID | No. Owned |
| 0001 | 12 |
| 0002 | 3 |
| 0006 | 1 |
| 0014 | 7 |
| . | . |

FIG. 6

Proprietary Character Information: (3)
Proprietary Character Information: (2)

Proprietary Character Information: (1)

| Character ID | Level | Attack Strength | Defense Strength | Hit Points | Item ID | Experience values |
|---|---|---|---|---|---|---|
| 0001 | 3 | 25 | 100 | 60 | 01020 | 120 |
| 0004 | 4 | 70 | 70 | 80 | -- | 250 |
| 0012 | 7 | 60 | 300 | 100 | 01059 | 2615 |
| . | . | . | . | . | . | . |
| . | . | . | . | . | . | . |
| . | . | . | . | . | . | . |

FIG. 7

Deck Information: (3)
Deck Information: (2)

Deck Information: (1)

| Deck ID | Deck Name | Constituent Character | Arrangement | Leader |
|---|---|---|---|---|
| 1 | Team A | 0001 | 4 | |
| | | 0004 | 2 | O |
| | | 0017 | 1 | |
| | | 0038 | 5 | |
| | | 0054 | 3 | |
| . | . | . | . | . |
| . | . | . | . | . |
| . | . | . | . | . |

FIG. 8

| Combo Attack Information | | | |
|---|---|---|---|
| Combo ID | Launch Condition | | Special Effect |
| | Attitude | Time Difference | |
| 1 | All attitudes | Within 0.2 seconds | Attack strength 2x |
| 2 | Fire/water/wind | Within 0.5 seconds | Attack strength 3x |
| 3 | All attitudes | Within 0.6 seconds | Attack frequency 3x |
| . | . | . | . |
| . | . | . | . |
| . | . | . | . |

GAME PROGRAM AND INFORMATION PROCESSING DEVICE

The present application claims the benefit of Japanese Patent Application No. JP2014-224943, filed on Nov. 5, 2014, the content of which is incorporated herein in its entirety by reference.

BACKGROUND

1. Technical Field

The present invention relates to a game program (e.g., non-transitory computer readable medium having machine-executable instructions with which a computer having a storage and a hardware processor, for providing a service) and an information processing device.

2. Related Art

Games in which characters displayed on the screen are manipulated to conduct a battle between two characters are well-known. For example, Patent Document 1 discloses an invention that relates to a battle game in which performing touch gestures and drag gestures with respect to characters displayed on a touch panel makes it possible to quickly indicate operations performed on said characters.

PRIOR ART DOCUMENTS

Patent Documents

Patent Document 1: Japanese Patent Application 2009-18202

Problems to be Solved by the Invention

Since a need for repeated input of operating instructions (for example, touch gestures) arises in such games during each battle, a considerable effort is required of the players. In particular, when operating instructions are issued for multiple characters, simple input operations (touch gestures) must be performed individually for each of the characters, which is one of the reasons why the players get tired of the game.

The present invention has been devised by taking such circumstances into consideration and it is an object of the invention to provide a game system that makes issuing operating instructions to characters more efficient and entertaining.

SUMMARY

The main aspect of the present invention intended to eliminate the above-described problems is a game program (e.g., non-transitory computer readable medium having machine-executable instructions with which a computer having a storage and a hardware processor, for providing a service), wherein a computer is caused to execute a screen generation process that generates a game screen having disposed thereon multiple selectable objects that a player is allowed to select;

an acceptance process that accepts selection operation input on said selectable objects at the moment when a pointing location initially arrives at the location of a selectable object disposed on the game screen while the movement of said pointing location on the game screen is maintained by the player's operations, and said acceptance process accepts the selection operation input in a sequential manner, starting with the selectable object at which the pointing location arrives the earliest; and a special effect generation process that generates special effects in the course of a game driven by the player's operations based on at least one of the moment when the pointing location initially arrives at the location of the selectable object, or the order in which the selection operation input on the selectable objects is accepted.

Other features of the present invention will become apparent from this Specification and the accompanying Drawings.

BRIEF DESCRIPTION OF THE DRAWINGS

FIG. 3 A diagram illustrating an example data structure of item information.

FIG. 4 A diagram illustrating an example data structure of character information.

FIG. 5 A diagram illustrating an example data structure of player information.

FIG. 6 A diagram illustrating an example data structure of proprietary item information.

FIG. 7 A diagram illustrating an example data structure of proprietary character information.

FIG. 8 A diagram illustrating an example data structure of the deck information.

DETAILED DESCRIPTION

Figure 1:
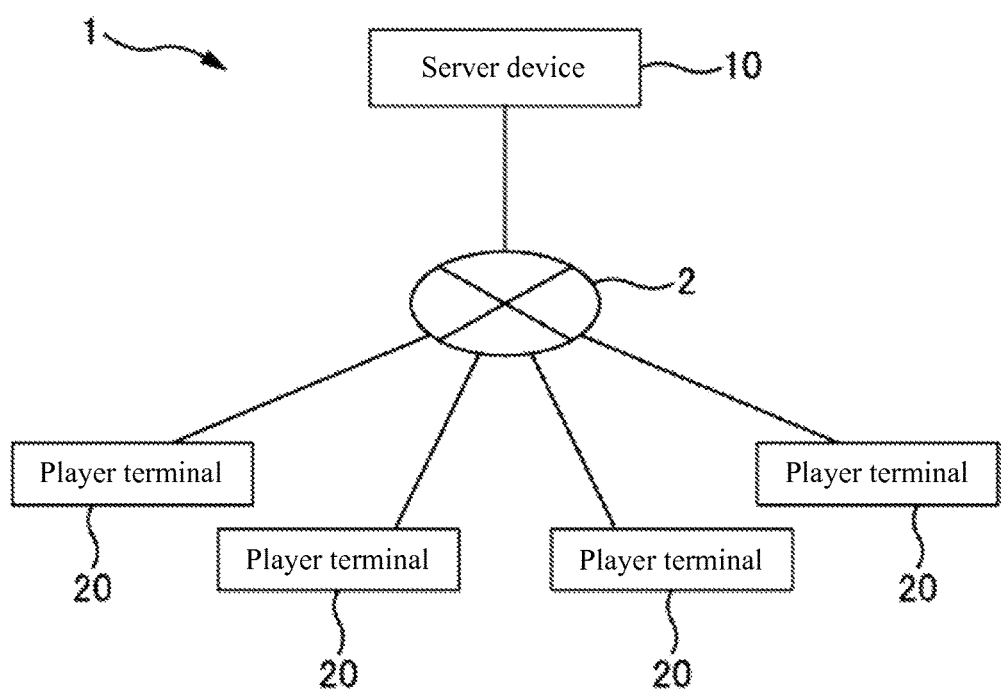
FIG. 1 A diagram illustrating an example configuration of the entire game system 1.

At least the following will be apparent from this Specification and the accompanying drawings.

Specifically, this is a game program (e.g., non-transitory computer readable medium having machine-executable instructions with which a computer having a storage and a hardware processor, for providing a service), wherein a computer is caused to execute a screen generation process that generates a game screen having disposed thereon multiple selectable objects that a player is allowed to select;

an acceptance process that accepts selection operation input on said selectable objects at the moment when a pointing location initially arrives at the location of a selectable object disposed on the game screen while the movement of said pointing location on the game screen is maintained by the player's operations, and said acceptance process accepts the selection operation input in a sequential manner starting with the selectable object at which the pointing location arrives the earliest; and a special effect generation process that generates special effects in the course of a game driven by the player's operations based on at least one of the moment when the pointing location initially arrives at the location of the selectable object, or the order in which the selection operation input on the selectable objects is accepted.

In accordance with such a game program, the order and timing of selection are changed at will by sliding the selection-indicating location across multiple selectable objects (e.g., characters), thereby permitting efficient operation of the selectable objects. In addition, the player's interest and excitement can be heightened because special effects can be generated under predetermined conditions in accordance with the order and timing of selection.

In addition, such a game program may be adapted such that the screen generation process generates a game screen including a control area where the multiple selectable objects are disposed, and the acceptance process accepts the selection operation input on said selectable objects at the moment when the pointing location initially arrives at the location of a selectable object disposed in the control area, regardless of whether or not the pointing location has been located outside the control area, while the movement of the pointing location on the game screen is maintained by the player's operations.

In accordance with such a game program, when the player issues selection operation instructions for selectable objects (e.g., characters), the pointing location can be slid so as to pass through areas other than the area in which the selectable objects are displayed. This facilitates selection of multiple selectable objects in a single action using the desired order and timing, and allows for selection operation instructions to be issued in a more efficient manner.

In addition, such a game program may be adapted such that a computer is caused to execute a counting process that starts counting standby time associated with each of the selectable objects in the order of acceptance of the selection operation input, and an action control process that establishes control over the actions of controlled objects associated with each of the selectable objects upon the elapse of the respective standby time, and the special effect generation process determines whether nor not a time difference between an earlier action of a controlled object associated with a certain selectable object and a later action of a controlled object associated with another selectable object is within a predetermined period of time and generates special effects in the course of a game driven by the player's operations if it is determined to be within the predetermined period of time.

In accordance with such a game program, changing the order and timing of selection of the selectable objects allows the player to generate special effects that provide advantages in the battle game. As a result, the strategic nuance of the game is enhanced and the player's interest and excitement can be further heightened.

In addition, such a game program may be adapted such that the action control process exercises control based on action frequencies associated with each of the controlled objects such that said controlled objects successively perform actions, and the special effect generation process uses the action frequencies to determine whether or not the time difference is within the predetermined period of time whenever each one of the successive actions is carried out by a controlled object associated with a certain selectable object.

Such a game program makes it possible to generate special effects in the battle game in accordance with action frequencies (e.g., attack frequencies) configured for each controlled object. Therefore, the player can conduct the game in an advantageous manner by taking the action frequencies into account and adjusting, for example, the order and timing of the selection operations on the selectable objects. This can further enhance the strategic nuance of the game.

In addition, such a game program may be adapted such that the special effect generation process increases the benefits provided to the controlled objects associated with the selectable objects selected by the selection operations of the player if the order of acceptance of the selection operation input for said selectable objects is comparatively late.

In accordance with such a game program, changing the order and timing of selection of the selectable objects allows the player to acquire rarer items or gain more game points. This can further heighten the player's interest and excitement.

In addition, this is an information processing device which is provided with:

a screen generation module that generates a game screen having disposed thereon multiple selectable objects that a player is allowed to select;

an acceptance module that accepts the selection operation input on said selectable objects at the moment when a pointing location initially arrives at the location of a selectable object disposed on the game screen while the movement of the pointing location on the game screen is maintained by the player's operations, and said acceptance module accepts the selection operation input in a sequential manner starting with the selectable object at which the pointing location arrives the earliest;

a special effect generation module that generates special effects in the course of a game driven by the player's operations based on at least one of the moment when the pointing location initially arrives at the location of the selectable object, or the order in which the selection operation input on the selectable objects is accepted In accordance with such an information processing device, the player can efficiently operate characters by changing the order and timing of selection of the multiple selectable objects at will. In addition, the player's interest and excitement can be heightened because special effects can be generated under predetermined conditions in accordance with the order and timing of selection.

===Embodiments===

<<Configuration of Game System 1>>

FIG. 1 is a diagram illustrating an example configuration of the entire game system 1 according to the present embodiment. The game system 1 provides various game-related services to the player over a network 2 (for example, the Internet) and includes a server device 10 and multiple player terminals 20.

The game system 1 according to the present embodiment can provide players with a battle game conducted using character cards (hereinafter referred to simply as "characters") as an example of game content objects.

In a battle game, the player engages in combat with an enemy (enemy character(s) operated by an opponent player or a computer) by operating a battle deck composed of multiple characters. Operating instructions issued to the multiple characters in the battle deck are carried out respectively for each one of the multiple characters displayed on the game screen. At such time, sliding a pointing location that indicates selectable objects displayed in association with each of the multiple characters (e.g., buttons used for character selection and operation and the characters themselves) makes it possible to continuously select characters and carry out operating instructions. As a result, the multiple characters can be efficiently operated.

In addition, moving the pointing location on the game screen enables the player to freely change the timing and order of selection and operation of the selectable objects (characters). Special effects are then activated under predetermined conditions in accordance with the timing and order of selection of each character. When these special effects are activated, the characters carry out attacks that provide an advantage in the battle and perform special choreographed actions on the game screen, as a result of which the strategic nuance of the game is enhanced and the game is made more entertaining.

<<Configuration of Server Device 10>>

Figure 2:
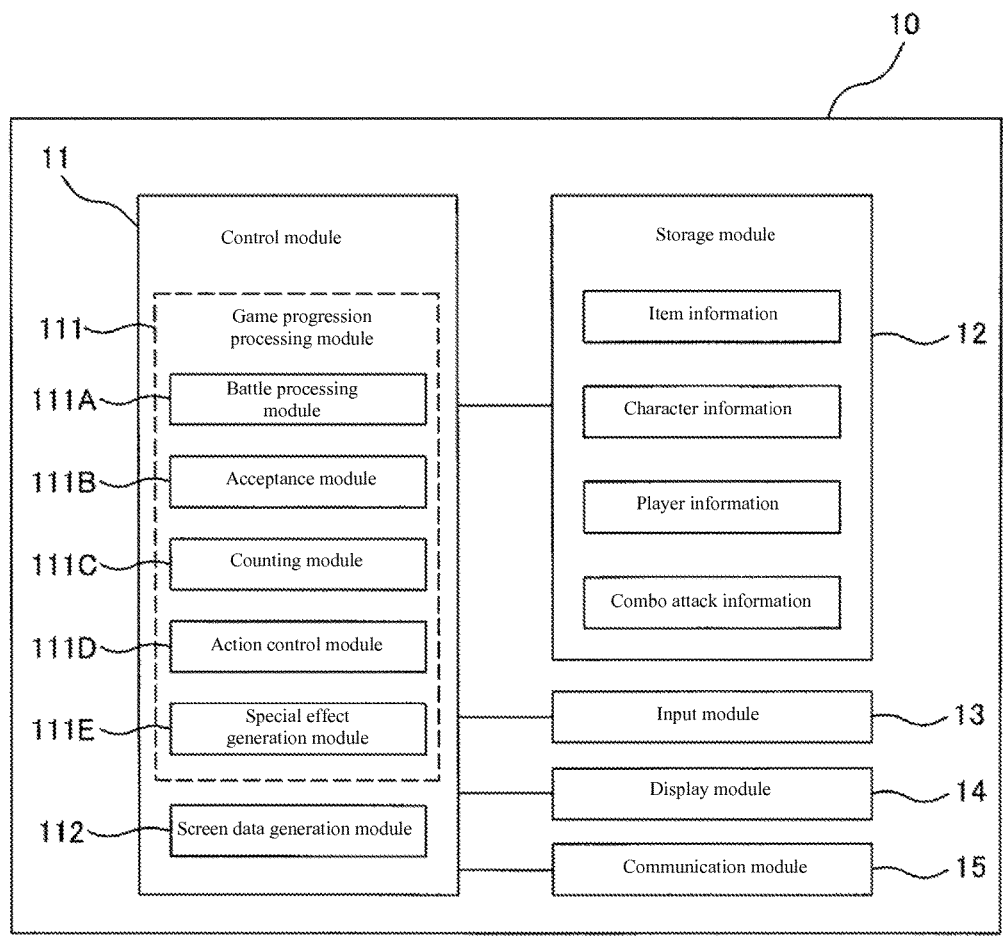
FIG. 2 A block diagram illustrating the functional configuration of the server device 10.

FIG. 2 is a block diagram illustrating the functional configuration of the server device 10. The server device 10 is an information processing device (for example, a workstation, a personal computer, etc.) used by a system administrator to operate and manage a variety of services. Upon receiving various commands (requests) from player terminals 20, the server device 10 transmits (responds by sending) game programs operational on the player terminals 20 and various types of data and web pages (game screens, etc.) created using a markup language (HTML, etc.) compliant with the specifications of the player terminals 20. The server device 10 has a control module 11, a storage module 12, an input module 13, a display module 14, and a communication module 15.

The control module 11, along with transferring data between the components, exercises overall control over the server device 10, and is implemented using a CPU (Central Processing Unit) that runs a predetermined program stored in memory. The control module 11 of the present embodiment is provided at least with a game progression processing module 111 and a screen data generation module 112.

The game progression processing module 111 possesses functionality to carry out processing for directing the game to proceed in accordance with the game program. The game progression processing module 111 of the present embodiment comprises at least a battle processing module 111A, an acceptance module 111B, a counting module 111C, an action control module 111D, and a special effect generation module 111E.

The battle processing module 111A possesses functionality to execute various types of battle game-related processes. Upon accepting the player's operation input, the battle processing module 111A of the present embodiment directs a player character to execute a predetermined activity (e.g., an "attack") in accordance with the input operation and decides the winner of the battle game by comparing the parameters generated as a result of the executed activity with the parameters configured for the enemy character.

The acceptance module 111B possesses functionality to execute an acceptance process used to accept character selection operation input from the player. When the pointing location where a character selection instruction is carried out (e.g., a touch location on a touchscreen panel or a cursor location displayed on the game screen) is moved across the game screen as a result of the player's operations, the acceptance module 111B of the present embodiment carries out processing to accept selection operation input on the selectable characters (i.e., controlled object characters) at the moment when said pointing location initially arrives at the location of the selectable objects (characters) disposed on the game screen. At such time, the selection operation input is accepted in a sequential manner starting with selectable characters at which the pointing location arrives the earliest.

The counting module 111C possesses functionality to execute a counting process used to count standby time for each character during a battle game. The counting module 111C of the present embodiment performs processing that starts counting standby time associated with each of the selectable characters (controlled objects) in the order of acceptance of character selection operation input by the acceptance module 111B.

The action control module 111D possesses functionality to execute an action control process whereby control of various types is exercised over the actions (activities) of the characters during a battle game. Upon the elapse of the above-described standby time, the action control module 111D of the present embodiment performs a process whereby control is exercised over the actions (e.g., "attacks" and other activities) associated with each of the selectable characters (controlled objects).

The special effect generation module 111E possesses functionality to execute a special effect generation process that generates special effects under predetermined conditions during a battle game. The special effect generation module 111E of the present embodiment determines whether or not a time difference between an earlier action associated with a certain selectable character (controlled object) and a later action associated with another selectable character (controlled object) is within a predetermined period of time. Special effects are then generated in the course of a game driven by the player's operations if it is determined that this time difference is within the predetermined period of time. The specifics of the special effects will be described below in further detail.

The screen data generation module 112 (screen generation module) possesses functionality to carry out processing used to generate screen data for displaying a game screen on a player terminal 20. The screen data generation module 112 of the present embodiment generates HTML data as screen data corresponding to a game screen.

The storage module 12 has a ROM (Read Only Memory), which is a read-only storage area where operating system software is stored, and a RAM (Random Access Memory), which is a rewritable storage area used as a work area for arithmetic processing by the control module 11, and is implemented as a non-volatile storage device, such as a flash memory, a hard disk, and the like. The storage module 12 of the present embodiment stores various types of data, such as item information, character information, player information, combo attack information, and the like.

The input module 13, which is used by a system administrator to enter various types of data (e.g., item information and character information), is implemented, for example, as a keyboard, a mouse, and the like.

The display module 14, which is used to display operation screens used by the system administrator in response to commands from the control module 11, is implemented, for example, using a liquid crystal display (LCD: Liquid Crystal Display), and the like.

The communication module 15, which operates as a transceiver module intended for transmitting and receiving various types of information to and from the player terminals 20 over a network 2, is implemented, for example, using an NIC (Network Interface Card), and the like.

FIG. 3 is a diagram illustrating an example data structure of item information. Such item information has configured therein at least item names in association with item IDs.

FIG. 4 is a diagram illustrating an example data structure of character information. Such character information has configured therein, in association with a character ID, at least a character name, a character image, rarity classified into multiple levels (e.g., "common"→"uncommon"→"rare"→"super-rare"→"extremely super-rare"→"ultra-rare"), initial attack strength, upper attack strength limit, initial defense strength, upper defense strength limit, initial hit points, upper hit point limit, and various other parameters, as well as the character's skills, the character's attack frequency, the character's standby time and, in addition, information relating to the attributes of the character.

As used herein, a character's "skills" refer to special attacks and other capabilities activated by said character during a battle game. In addition to regular "skills", a character may be configured to have "leader skills", which are activated if said character is configured as a leader. A character's "attack frequency" is the number of times the character can attack an enemy character in a single action (activity) during a battle game. Characters with higher attack frequencies can attack enemy characters in a more continuous manner. A character's "standby time" is the time that needs to pass before the character that receives an attack instruction, when an attack instruction is issued by the player, actually attacks an enemy character. The shorter a character's standby time, the shorter the time that needs to pass between the receipt of the attack instruction and the attack on the enemy character. In other words, the attack can be carried out sooner.

FIG. 5 is a diagram illustrating an example data structure of player information. Such player information has configured therein, in association with a player ID, at least a player name and level, as well as proprietary item information (i.e., information on the items owned by the player, hereinafter referred to as "proprietary items"), proprietary character information (i.e., information on the characters owned by the player, hereinafter referred to as "proprietary characters"), deck information (i.e., information on battle decks made up of multiple characters assembled by the player), and game progress information (i.e., information on each player's game progress). For example, the current player's in-game ranking and experience values, number-of-wins points, frequency of logins to the game, and so forth are configured as the game progress information.

FIG. 6 is a diagram illustrating an example data structure of proprietary item information. Such proprietary item information has at least the number of each of the items owned by the player configured therein in association with an item ID.

FIG. 7 is a diagram illustrating an example data structure of proprietary character information. Such proprietary character information has configured therein, in association with the character ID of a proprietary character, at least level, attack strength, defense strength, hit points, and various other parameters, as well as IDs of weapons the character is equipped with and character's experience value.

FIG. 8 is a diagram illustrating an example data structure of the deck information. Such deck information has configured therein, in association with a deck ID, at least a deck name, constituent characters, character arrangement, and a leader. The constituent characters represent information indicating the character IDs of the player characters that make up a deck. The character arrangement represents information indicating the location of the characters on the game screen in a battle game. The leader represents information that indicates a character configured as the leader of the deck.

Figures 9, 10:
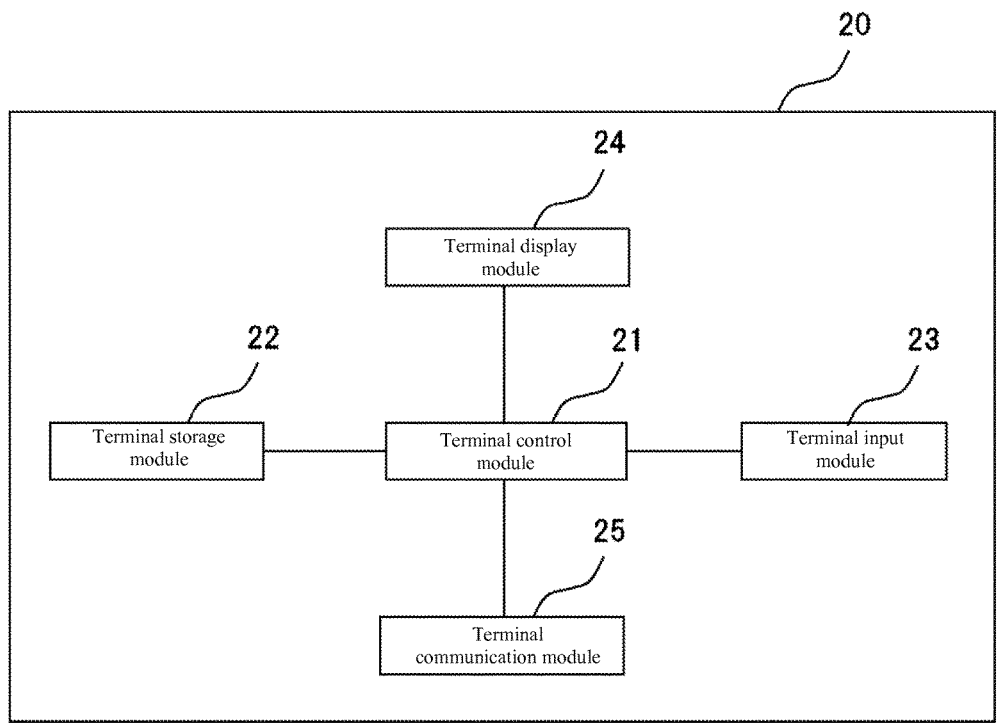
FIG. 9 A diagram illustrating an example data structure of the combo attack information.
FIG. 10 A block diagram illustrating the functional configuration of the player terminal 20.

FIG. 9 is a diagram illustrating an example data structure of the combo attack information. Such combo attack information has configured therein, in association with a combo ID, at least a combo attack launch condition (e.g., an attribute or time difference) and a special effect.

A combo attack is an action that takes place when two or more different characters carry out an attack (action) against an enemy character and, if a time difference between an attack by a first character and an attack by a second character satisfies a predetermined condition, said attack is accompanied by special effects, such as being able to attack the enemy character using an attack strength that is greater than that of a regular attack. The combo attack information of the present embodiment has predefined therein, as a combo attack launch condition, a time difference between the attacks carried out by two or more characters. For example, in the case of the combo attack with a combo ID 1 in FIG. 9, a special effect is activated whereby the attack strength of each of the characters is doubled if the time difference between an attack by a first character and an attack by a second character is within 0.2 seconds. It should be noted that, if the time difference is within 0.2 seconds, any of the two characters may be the first to carry out an attack and the time of the attacks may be simultaneous. In addition, if attacks are carried out by three or more characters, the combo attacks continue as long as the time difference between the respective attacks remains within 0.2 seconds. For example, if five characters attacked an enemy character one after another while keeping the respective time differences within 0.2 seconds, a considerable effect would be produced due to activating special effects for five combo attacks.

It should be noted that the attributes of the multiple characters carrying out attacks (actions) in a battle game may be configured as combo attack launch conditions. For example, in the case of the combo attack that has a combo ID 2 in FIG. 9, the launch condition is that two or more characters having any attribute selected from "fire", "water", or "wind" carry out respective attacks while keeping the time difference within 0.5 seconds.

<<Configuration of Player Terminal 20>>

FIG. 10 is a block diagram illustrating the functional configuration of a player terminal 20. The player terminals 20 are information processing devices owned and used by the players (e.g., tablet terminals, mobile phone terminals, smartphones, and the like). Due to the web browser functionality they possess, the player terminals 20 are capable of on-screen display of web pages (game screens, and the like) transmitted from the server device 10. A player terminal 20 has a terminal control module 21 used for overall control of the player terminal 20, a terminal storage module 22 used for storing various types of data and programs, a terminal input module 23 used by the player for operation input, a terminal display module 24 used for displaying game screens and operation screens, and a terminal communication module 25 used for communicating information to and from the server device 10.

<<Operation of Game System 1>>

Figure 11:
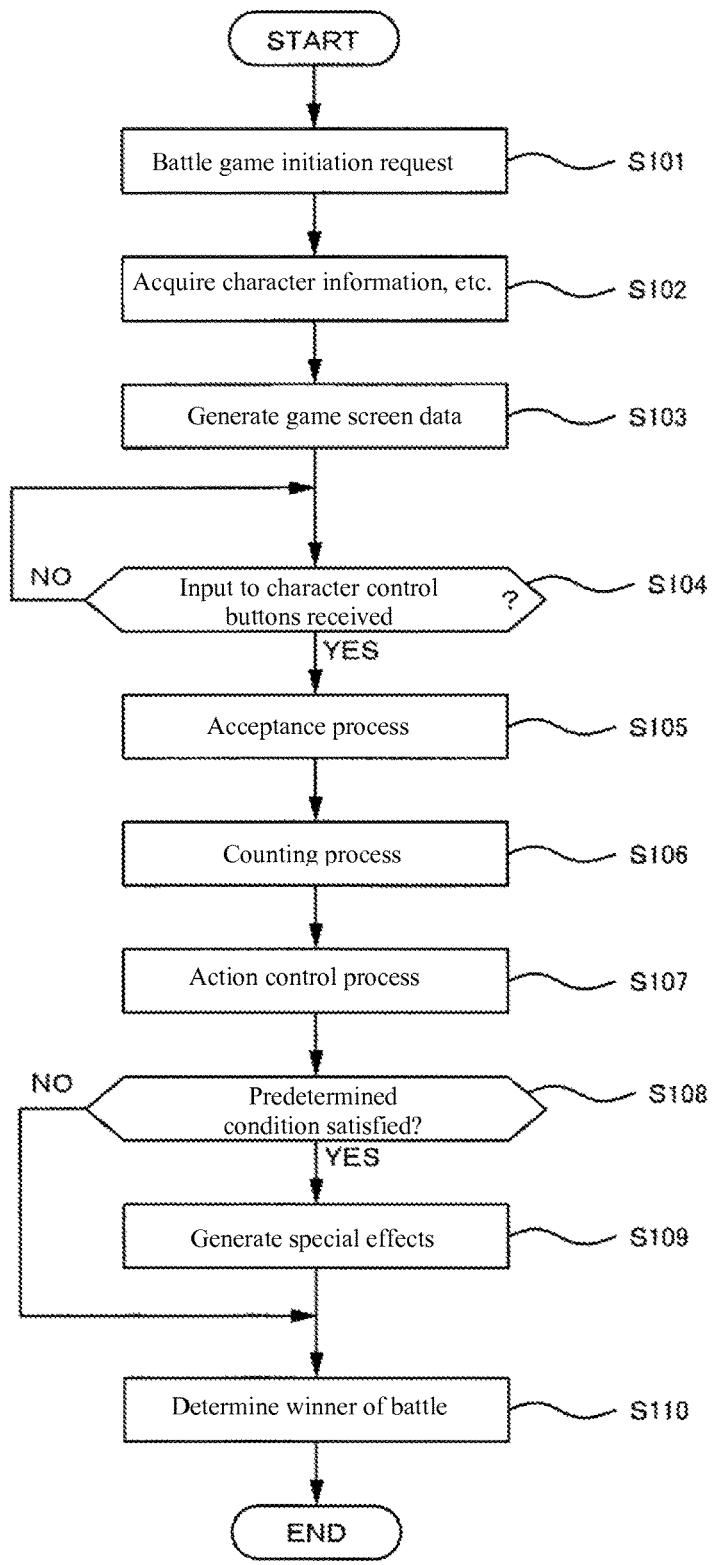
FIG. 11 A flow chart illustrating processes of various types performed when a battle game is played on the game system 1.

FIG. 11 is a flow chart illustrating various types of processing performed when a battle game is played on the game system 1.

First, by operating a player terminal 20, a player issues a request to initiate a battle game (S101). Processing of various types intended to execute a battle game is initiated when the server device 10 accepts the battle game initiation request from the player through the player terminal 20.

Next, along with acquiring enemy character-related information by accessing the character information stored in the storage module 12, the control module 11 acquires information related to the battle deck composed of the multiple player characters participating in the battle game by accessing the deck information contained in the player information (S102).

Next, the screen data generation module 112 generates game screen data for the battle game based on the enemy character information and deck information acquired in S102 and displays it on the player terminal 20 (S103).

Figure 12:
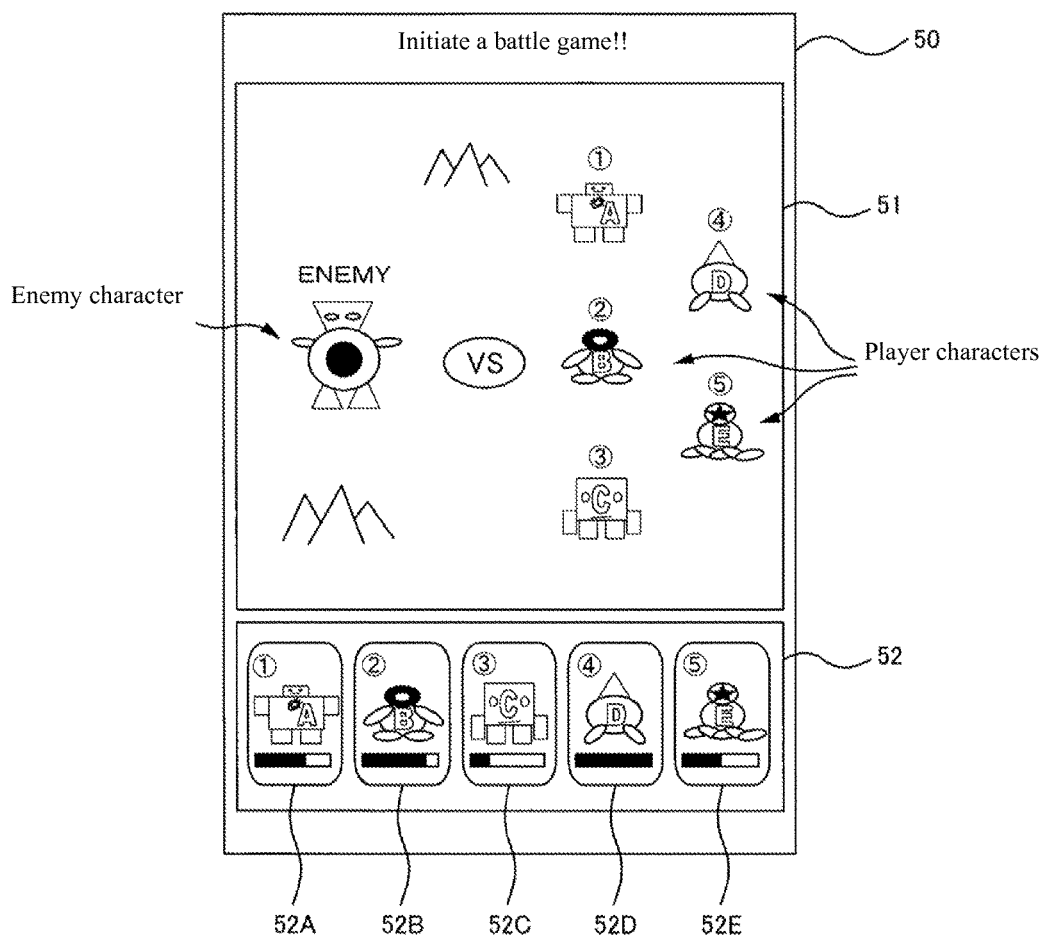
FIG. 12 A diagram illustrating an example game screen 50 used in a battle game.

FIG. 12 is a diagram illustrating an example of a game screen 50 used in a battle game. The game screen 50 used to conduct battle games in the present embodiment has a character display area 51 used to display the images and arrangement of the characters, and a control area 52 used by the player to issue operating instructions. The images of the enemy characters and the images of the multiple player characters that make up the player's battle deck are displayed in the character display area 51. Multiple character control buttons are disposed in the control area 52. The "character control buttons" are provided for each one of the multiple player characters, and the player can select and operate the characters associated with said character control buttons by selecting predetermined character control buttons (e.g., by touching the character control buttons) to input operating instructions. In other words, the "character control buttons" are "selectable objects" intended to allow the player to select the desired characters and carry out operating instructions. In the example of FIG. 12, there are five character control buttons 52A-52E respectively associated with five characters participating in the battle game. The arrangement of the character control buttons 52A-52E is determined, for example, based on the "arrangement" information contained in the deck information (see FIG. 8).

It should be noted that information on the parameters and standby time configured for the characters (controlled objects) respectively associated with the character control buttons as well as the images of said characters may be displayed in said character control buttons. If such information is displayed in the character control buttons, the player can use it for reference when determining the order of character selection and the like.

Next, referring back to FIG. 11, the player terminal 20 determines whether or not there has been any input to the character control buttons from the player (S104). Then, if there has been no input (S104: NO), standby mode is maintained until there is input from the player. At such time, a message prompting the player for input may be displayed on the game screen. If there has been input from the player (S104: YES), the procedure advances to S105.

Next, if there has been any input to the character control buttons from the player, the acceptance module 111B performs an acceptance process to accept the input of operating instructions from the player (S105). As shown in the example of FIG. 12, there are multiple character control buttons (i.e., selectable objects) disposed on the game screen 50 used to conduct the battle game in the present embodiment. The player can operate the player characters in a variety of patterns by changing the timing and order in which these multiple character control buttons are selected and indicated.

In the present embodiment, operational input for the character associated with the character control button is accepted at the moment when the player points at (touches) the location where said character control button is disposed on the game screen. The locations of the multiple character control buttons are then sequentially pointed at (touched), as a result of which selection operation input with respect to the characters associated with the respective character control buttons is accepted in a sequential manner. At such time, the player can perform selection operation input to multiple characters as a single action by sliding the pointing location across the multiple character control buttons displayed on the game screen. In other words, the selection operation input can be accepted in a sequential manner starting with the selectable object at which said pointing location arrives the earliest, while the movement of the pointing location on the game screen is maintained by the player's operations.

Figure 13:
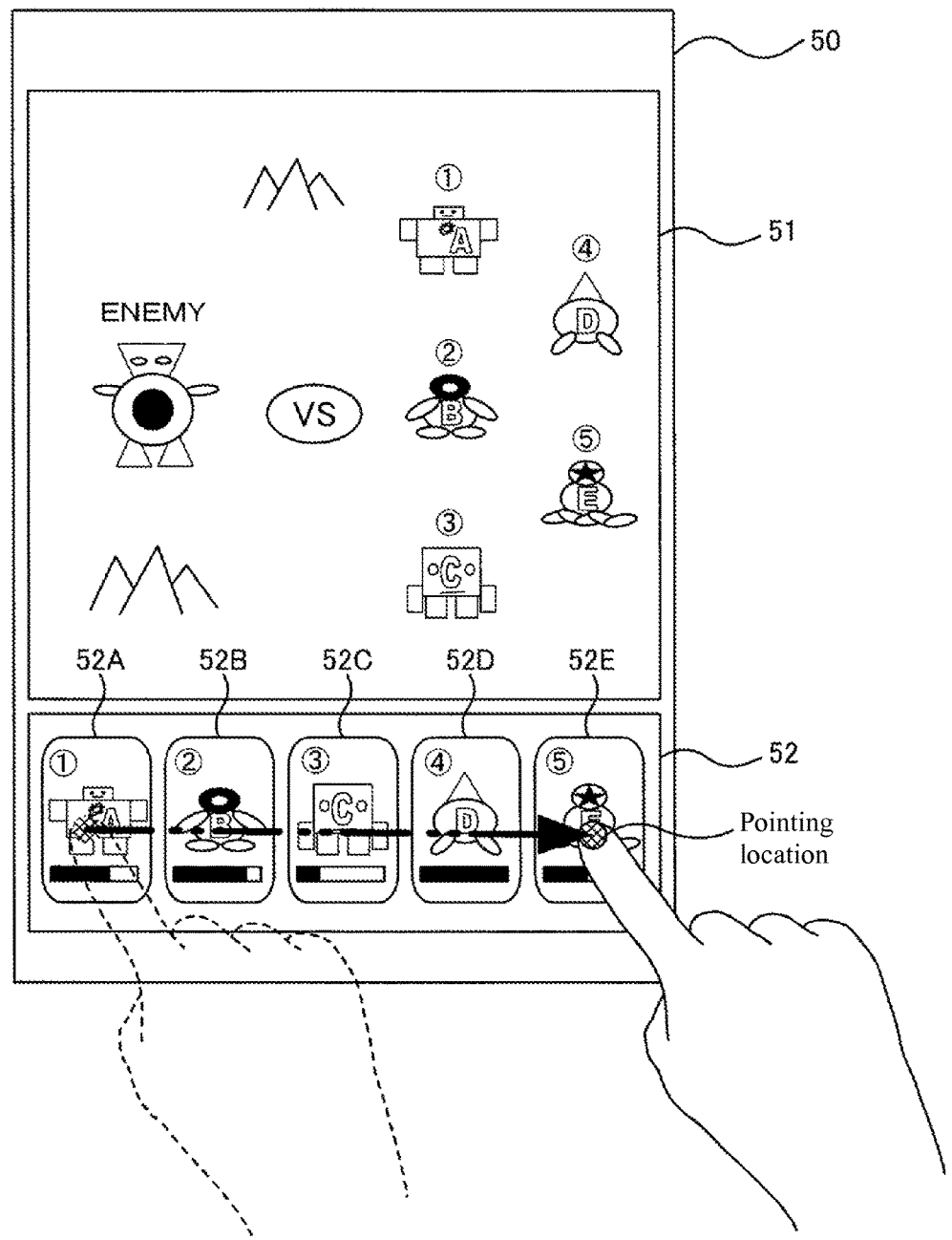
FIG. 13 A diagram illustrating specific actions performed when the player enters character selection operations.

FIG. 13 is a diagram illustrating specific actions performed when the player enters character selection operations. FIG. 13 shows an example in which the player performs selection in the following order: Character Control Button 52A (Character A), Character Control Button 52B (Character B), Character Control Button 52C (Character C), Character Control Button 52D (Character D), and Character Control Button 52E (Character E). First, the player points at (touches) the location of Character Control Button 52A. As a result, operational input is accepted such that Character A, which is associated with Character Control Button 52A, is selected at first. Next, the pointing location is slid to the location of Character Control Button 52B, which is disposed to the right of Character Control Button 52A. Accordingly, operational input is accepted such that Character B is the second item selected. The sliding movement of the pointing location is thus continued (the movement of the pointing location is maintained) all the way to the location of Character Control Button 52E, as a result of which selection operation input is accepted for the characters in the order of arrival of said pointing location at the location of the predetermined character control buttons. Therefore, the player can efficiently issue operating instructions using a single sliding movement of the pointing location.

Figure 14:
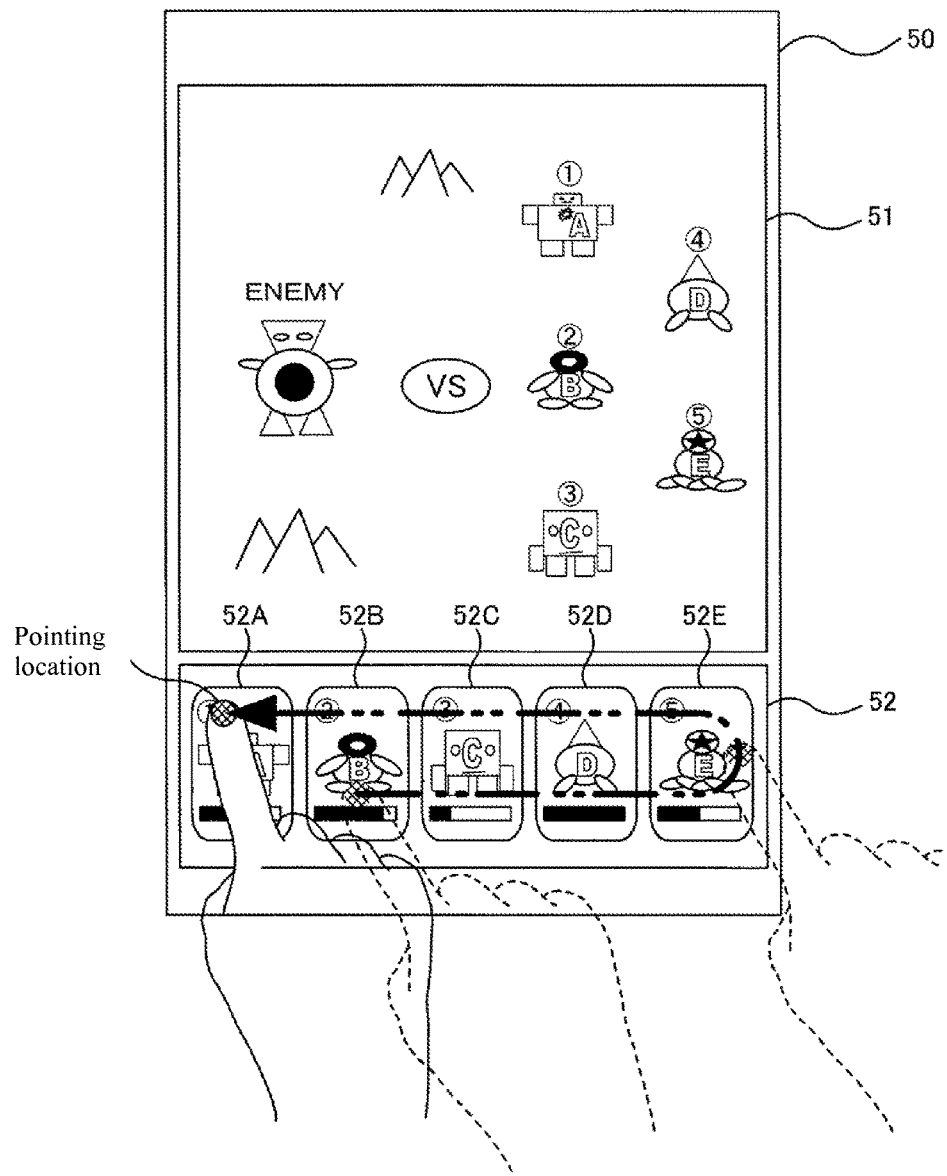
FIG. 14 A diagram illustrating specific actions performed when the player enters character selection operations.
Figure 15:
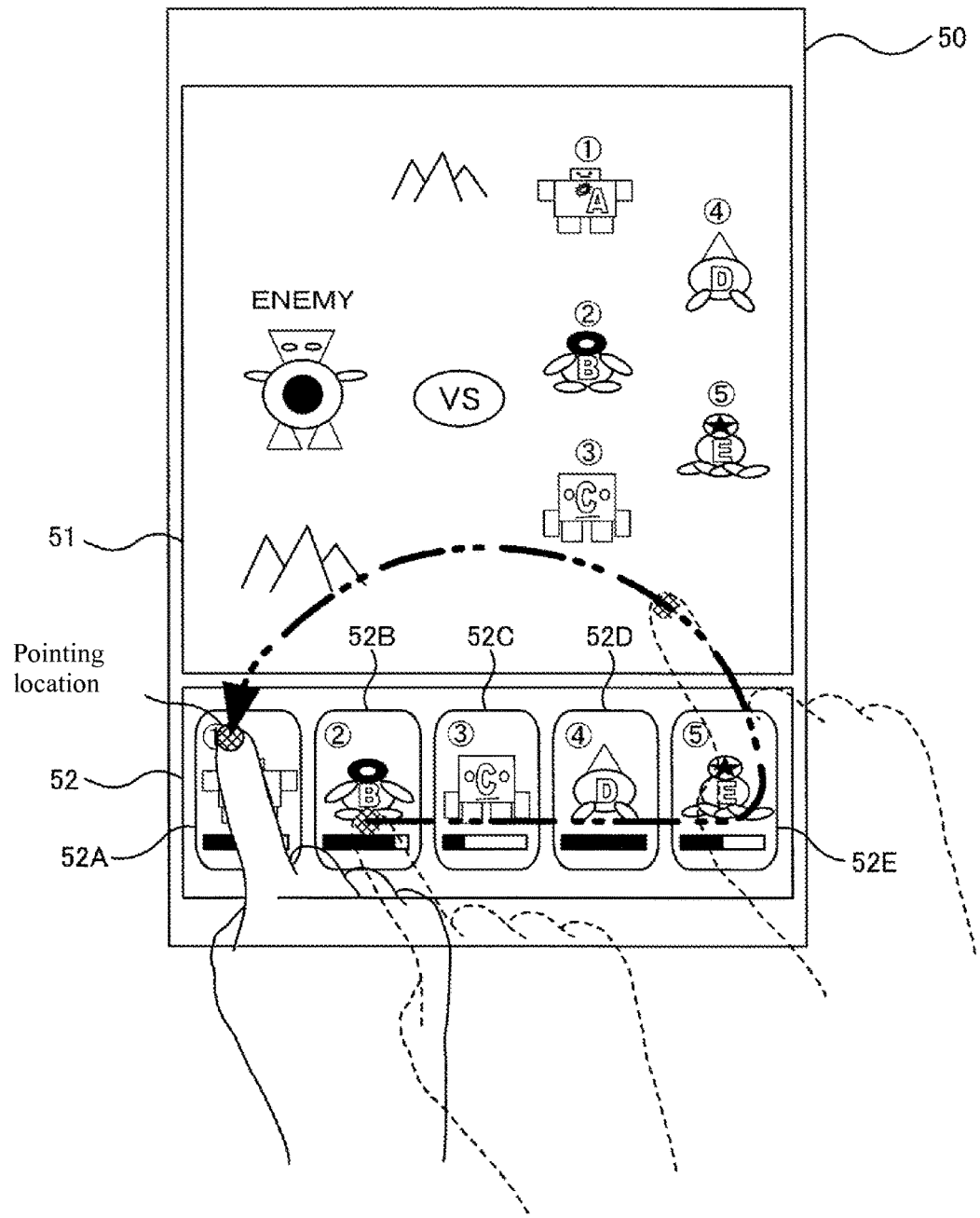
FIG. 15 A diagram illustrating specific actions performed when the player enters character selection operations.

FIG. 14 and FIG. 15 are diagrams illustrating specific actions performed when the player enters character selection operations. They depict examples in which the player performs selection in the following order: Character Control Button 52B (Character B), Character Control Button 52C (Character C), Character Control Button 52D (Character D), Character Control Button 52E (Character E), and Character Control Button 52A (Character A). In FIG. 14, the player first points at the location of Character Control Button 52B, and then sequentially selects characters from Character B to Character E by sliding the pointing location all the way to the location of Character Control Button 52E. After that, the direction of travel of the pointing location is reversed and the pointing location is slid from the location of Character Control Button 52E to the location of Character Control Button 52A. At such time, said pointing location passes through the locations of Character Control Buttons 52D, 52C, and 52B, but because selection operation input to these character control buttons has already been accepted at the moment of the initial arrival of the pointing location, selection operation input from the moment of the second arrival of the pointing location and thereafter is not accepted. Therefore, the player can efficiently issue operating instructions simply by sliding the pointing location back and forth.

In addition, in the acceptance process of the present embodiment, selection operation input via the character control buttons is accepted at the moment when the pointing location initially arrives at the location of said character control buttons (selectable objects) disposed in control area 52, regardless of whether or not the pointing location has been located outside the control area 52. In other words, when the player slides the pointing location, it may be allowed to pass through areas other than the control area 52. In FIG. 15, after sequentially selecting buttons from Character Control Button 52B to Character Control Button 52E by sliding the pointing location therethrough, the player moves the pointing location outside the control area 52 and brings it to the location of Character Control Button 52A by passing through the character display area 51. In such a case, the input of character selection operations is also accepted in the order of initial arrival of the pointing location.

It should be noted that while the above-described specific actions have been described by referring to a case involving selection of all the character control buttons disposed in the control area 52 by the player (a case in which all the characters are selected), it is possible to select only some of the character control buttons (only some of the characters may be selected). For example, when the game screen 50 shown in FIG. 13 is displayed, the player first points at the location of Character Control Button 52A. After that, the player slides the pointing location to the location of Character Control Button 52C and then stops touching the screen, as a result of which characters from Character A to Character C are selected in sequence. At such time, character selection is confirmed and selection operation input for the characters is accepted at the moment when the pointing location arrives at the character control buttons. In addition to this, character selection may be confirmed and selection operation input for the characters may be accepted at the moment when the pointing location moves away from the character control buttons. In this manner, the player can efficiently issue operating instructions for some of the characters by simply sliding the pointing location in a single movement and then performing a stop-touching action.

Furthermore, operating instructions for the remaining two characters may be issued immediately after this stop-touching action. For example, after first pointing at the location of Character Control Button 52D, the player may slide the pointing location to the location of Character Control Button 52E and then stop touching the screen, thereby sequentially selecting Character D and Character E. In addition, Character D and Character E may be selected individually if the player, for example, makes a tapping gesture respectively on Character Control Button 52D and Character Control Button 52E. Thus, the player can efficiently attack or use skills on the characters by sliding the pointing location or making tapping gestures.

As a result of combining these actions, the player can select the characters in the desired order to issue operating instructions while sliding the pointing location.

Next, referring back to FIG. 11, the counting module 111C performs a counting process that starts counting the standby time associated with each selected character in the order of acceptance of the selection operation input (S106). For example, if operational input related to Character A is accepted in S105, the counting module 111C starts counting standby time for Character A at the moment when said operational input is accepted.

Next, the action control module 111D performs an action control process in which control is established over the actions associated with each of said characters upon the elapse of the standby time associated with each respective character (S107). For example, if the standby time count is initiated for character A in S106, the action control module 111D exercises control such that Character A is made to perform a predetermined action upon the elapse of 3 seconds, which is the standby time associated with Character A (see FIG. 4). In the battle game of the present embodiment, actions involving characters' attacks on enemy characters are performed based on the "attack frequency" associated with each character. For example, since Character A has an action with an "Attack frequency: 5" associated therewith (see FIG. 4), Character A carries out five successive attacks on the enemy character upon the elapse of the standby time.

It should be noted that, during the time between the acceptance of operational input for a character and the elapse of the standby time, said selected character may be controlled so as to move it to the location where an enemy character is displayed on the game screen. In other words, the time required for a character to approach an attack object and initiate an attack may be handled as "standby time". As a result of performing such choreographed actions, each character appears to act from one minute to another during the battle game, which heightens the player's interest and excitement.

Next, the special effect generation module 111E determines whether or not a predetermined condition is satisfied (S108). As used herein, the phrase "predetermined condition" refers to a situation in which the time difference between an earlier action (attack) by a certain character and a later action (attack) by another character is within a predetermined period of time. In other words, it is determined whether or not the combo attack launch condition described in FIG. 8 is satisfied. As a result of such determination, the procedure advances to the process of S110 if the predetermined condition is not satisfied (S108: NO), and to the process of S109 if the predetermined is satisfied (S108: YES).

Next, if the predetermined condition is satisfied, the special effect generation module 111E generates special effects in the course of the battle game (S109). In the present embodiment, a combo attack is launched if the above-described combo attack launch condition is satisfied. For example, in FIG. 13, it is assumed that the selection operation input for Character B is accepted as a second input 1 second after the selection operation input for Character A is initially accepted. In such a case, Character A starts an attack on the enemy character upon the elapse of 3 seconds (i.e., the standby time). In the same manner, Character B starts an attack on the enemy character upon the elapse of 2 seconds (i.e., the standby time). Here, since the standby time count for Character B starts 1 second after the start of the standby time count for Character A, the time of the start of attack by Character A (3 seconds) and the time of the start of attack by Character B (1 second+2 seconds) are simultaneous. In other words, the time difference between Character A's attack (action) and Character B's attack (action) is within 0.2 seconds. Therefore, since the condition of combo ID 1 in FIG. 9 is satisfied, a "special effect" is generated whereby the attack strength of Character A and Character B is doubled. It should be noted that when multiple conditions are simultaneously satisfied, it is possible either to generate a special effect with the highest order of priority based on a pre-configured order of priority, or generate multiple special effects at the same time.

In addition, due to the fact that each character is respectively configured to have an "attack frequency", whenever each one of the successive attacks is carried out by a character in accordance with the configured attack frequency (i.e., action frequency), the special effect generation module 111E determines whether or not the time difference relative to the next character's attack is within a predetermined period of time. For instance, in the above-described example, Character A, for which selection operation input is initially accepted, carries out attacks five times in a row upon the elapse of the standby time (2 seconds), and a time difference relative to an attack by the next character (in the above-described example, Character B) is determined for each one of these five successive attacks. In general, the higher a character's attack frequency, the longer the time between the start of an attack and the end of an attack, which increases the probability that the time difference relative to an attack conducted by another character is within the predetermined period of time. In other words, the probability of generating special effects increases. Therefore, after properly considering each character's standby time and attack frequency, the player determines the arrangement of the characters on the game screen (i.e., the configuration of the battle deck) and the timing and order of operational input, thereby making it possible to conduct the battle game in a more advantageous manner.

Next, the battle processing module 111A determines the winner of the battle (S110). When determining the winner of the battle, for example, the sum total of the attacks conducted by the player characters and the enemy character's hit point value are compared and victory is awarded to the player if the sum total of the attacks conducted by the player characters is greater than the enemy character's hit point value. Conversely, victory is awarded to the enemy character if the sum total of the attacks conducted by the player characters is smaller than the enemy character's hit point value. It should be noted that methods used to determine the winner are not limited to the above.

As described above, in the game system 1 according to the present embodiment, operations can be performed in an efficient manner because the player can issue operating instructions for multiple characters while sliding the pointing location. In addition, the battle game can be made more entertaining because it becomes possible to generate special effects under predetermined conditions by changing the timing and order of instructions for multiple characters.

===Other Embodiments===

The foregoing embodiment was intended to facilitate the understanding of the present invention and is not to be construed as limiting of the present invention. The present invention can be modified and improved without departing from its spirit and the present invention includes equivalents thereto. In particular, the embodiments described below are also included in the present invention.

<Regarding Special Effects>

Although the above-described embodiment has been explained with reference to a case in which an effect that launches a combo attack and increases attack strength in a battle game is generated as a special effect produced when predetermined conditions are satisfied during said battle game, other special effects may also be generated. For example, this may be a special effect whereby benefits are provided based on the order of acceptance of selection operation input with respect to multiple characters.

In such a case, the later the order of acceptance of the selection operation input for the character selected as a result of the player's selection operation (controlled object characters), the more benefits the special effect generation module 111E provides to said character. Specifically, among the multiple characters that make up the player's battle deck, the last character for which selection operation input was accepted during the battle game is provided with more recovery items, experience values, and so on, than the rest of the characters. The special effect generation module 111E stores the items and experience values to be provided as special effects in the storage module 12 in association with the character IDs of the proprietary character information.

In addition, the content of the special effects may be changed in accordance with the player's game progress information. For example, the higher the player's current ranking and frequency of game logins are, the more valuable the provided items or the greater the effects (e.g., attack strength) obtained during a combo attack may be.

<Regarding Configuration of Standby Time and Attack Frequency>

In the above-described embodiment, standby times and attack frequencies have been configured as character information in association with each character, but the respective value settings for the standby times and attack frequencies may be changed. For example, the higher the level of the character is, the higher the attack frequency may be or the shorter the standby time may become. In this manner, an effect is produced whereby the higher the level of the character, the easier it becomes to launch a combo attack. This serves as an incentive for the player to raise the character and can further heighten the player's interest and excitement.

In addition, the standby time and attack frequency may change if the character is configured as a leader of the deck and, in addition, the standby time and attack frequency may be adjusted according to the character's rarity and the type of skills configured in the character. In this manner, the battle game can be played to the player's advantage depending on the method of battle deck assembly, and the strategic nuance of the battle game can be enhanced and the player's interest and excitement can be heightened.

<Server Device>

In the present embodiments as described above, the explanations are given with reference to a game system 1 equipped with a single server device 10 as an example of a service device. The invention, however, is not limited thereto and a game system 1 equipped with multiple server devices 10, as an example of server devices, may also be used. In other words, multiple server devices 10 may be connected over a network 2 and these server devices 10 may perform various types of processing in a distributed manner.

<Information Processing Device>

In the game system 1 used in the present embodiment as described above, the explanations are given with reference to a case in which various types of information processing are carried out by directing the server device 10 and the player terminals 20 to cooperate based on a game program. The invention, however, is not limited thereto and the above-mentioned various types of information processing may be carried out based on the game program using the server device 10 alone or the player terminals 20 alone as information processing devices.

In addition, a configuration may be used in which the player terminals 20 support part of the information processing device functionality. In such a case, the server device 10 and player terminals 20 constitute an information processing device.

It should be noted that the information processing device is an example of a computer equipped with a processor and a memory.

DESCRIPTION OF THE REFERENCE NUMERALS

1 Game system
2 Network
10 Server device
11 Control module
12 Storage module
13 Input module 14 Display module
15 Communication module
20 Player terminal
21 Terminal control module
22 Terminal storage module
23 Terminal input module
24 Terminal display module
25 Terminal communication module
50 Game screen
51 Character display area
52 Control area
52A Character control button
52B Character control button
52C Character control button
52D Character control button
52E Character control button
111 Game progression processing module
111A Battle processing module
111B Acceptance module
111C Counting module
111D Action control module
111E Special effect generation module
112 Screen data generation module

The invention claimed is:

1. A non-transitory computer readable medium having machine-executable instructions with which a computer having a storage and a hardware processor, for providing a service, said machine-executable instructions comprising:
a screen generation process that generates a game screen having disposed thereon multiple selectable objects that a player is allowed to select;
an acceptance process that accepts selection operation input on said selectable objects at the moment when a pointing location initially arrives at the location of a selectable object disposed on the game screen while the movement of said pointing location on the game screen is maintained by the player's operations, and said acceptance process accepts the selection operation input in a sequential manner, starting with the selectable object at which the pointing location arrives the earliest;
a special effect generation process that generates special effects in the course of a game driven by the player's operations based on at least one of the moment when the pointing location initially arrives at the location of the selectable object, or the order in which the selection operation input on the selectable objects is accepted;
a counting process that starts counting standby time associated with each of the selectable objects in the order of acceptance of the selection operation input, and
an action control process that establishes control over the actions of controlled objects associated with each of the selectable objects upon the elapse of the respective standby time, and
the special effect generation process
determines whether nor not a time difference between an earlier action of a controlled object associated with a certain selectable object and a later action of a controlled object associated with another selectable object is within a predetermined period of time and
generates special effects in the course of a game driven by the player's operations if it is determined to be within the predetermined period of time;
wherein the screen generation process generates a game screen including a control area where the multiple selectable objects are disposed, and
the acceptance process accepts the selection operation input on said selectable objects at the moment when the pointing location initially arrives at the location of a selectable object disposed in the control area, regardless of whether or not the pointing location has been located outside the control area, while the movement of the pointing location on the game screen is maintained by the player's operations.

2. The non-transitory computer readable medium according to claim 1,
wherein
the action control process exercises control based on action frequencies associated with each of the controlled objects such that said controlled objects successively perform actions, and
the special effect generation process uses the action frequencies to determine whether or not the time difference is within the predetermined period of time whenever each one of the successive actions is carried out by a controlled object associated with said certain selectable object.

3. The non-transitory computer readable medium according to claim 1, wherein
the special effect generation process increases the benefits provided to the controlled objects associated with the selectable objects selected by the selection operations of the player if the order of acceptance of the selection operation input for said selectable objects is comparatively late.

4. A non-transitory computer readable medium having machine-executable instructions with which a computer having a storage and a hardware processor, for providing a service, said machine-executable instructions comprising:
a screen generation process that generates a game screen having disposed thereon multiple selectable objects that a player is allowed to select;
an acceptance process that accepts selection operation input on said selectable objects at the moment when a pointing location initially arrives at the location of a selectable object disposed on the game screen while the movement of said pointing location on the game screen is maintained by the player's operations, and said acceptance process accepts the selection operation input in a sequential manner, starting with the selectable object at which the pointing location arrives the earliest; and
a special effect generation process that generates special effects in the course of a game driven by the player's operations based on at least one of the moment when the pointing location initially arrives at the location of the selectable object, or the order in which the selection operation input on the selectable objects is accepted; and wherein
the special effect generation process increases the benefits provided to the controlled objects associated with the selectable objects selected by the selection operations of the player if the order of acceptance of the selection operation input for said selectable objects is comparatively late;
wherein the screen generation process generates a game screen including a control area where the multiple selectable objects are disposed, and
the acceptance process accepts the selection operation input on said selectable objects at the moment when the pointing location initially arrives at the location of a selectable object disposed in the control area, regardless of whether or not the pointing location has been located outside the control area, while the movement of the pointing location on the game screen is maintained by the player's operations.

5. An information processing device which is provided with:
- a screen generation module that generates a game screen having disposed thereon multiple selectable objects that a player is allowed to select;
- an acceptance module that accepts the selection operation input on said selectable objects at the moment when a pointing location initially arrives at the location of a selectable object disposed on the game screen while the movement of the pointing location on the game screen is maintained by the player's operations, and said acceptance module accepts the selection operation input in a sequential manner, starting with the selectable object at which the pointing location arrives the earliest; a special effect generation module that generates special effects in the course of a game driven by the player's operations based on at least one of the moment when the pointing location initially arrives at the location of the selectable object, or the order in which the selection operation input on the selectable objects is accepted;
- a counting module that starts counting the standby time associated with each of the selectable objects in the order of acceptance of the selection operation input; and
- an action control module that establishes control over the action of the controlled objects associated with each of the selectable objects upon the elapse of the respective standby time; and in which
- the special effect generation module
- determines whether or not a time difference between an earlier action of a controlled object associated with a certain selectable object and a later action of a controlled object associated with another selectable object is within a predetermined period of time and
- generates special effects in the course of a game driven by the player's operations if it is determined to be within the predetermined period of time;
- wherein the screen generation module generates a game screen including a control area where the multiple selectable objects are disposed, and
- the acceptance module accepts the selection operation input on said selectable objects at the moment when the pointing location initially arrives at the location of a selectable object disposed in the control area, regardless of whether or not the pointing location has been located outside the control area, while the movement of the pointing location on the game screen is maintained by the player's operations.

6. An information processing device which is provided with:
- a screen generation module that generates a game screen having disposed thereon multiple selectable objects that a player is allowed to select;
- an acceptance module that accepts the selection operation input on said selectable objects at the moment when a pointing location initially arrives at the location of a selectable object disposed on the game screen while the movement of said pointing location on the game screen is maintained by the player's operations, and
- said acceptance module accepts the selection operation input in a sequential manner, starting with the selectable object at which the pointing location arrives the earliest; and
- a special effect generation module that generates special effects in the course of a game driven by the player's operations based on at least one of the moment when the pointing location initially arrives at the location of the selectable object, or the order in which the selection operation input on the selectable objects is accepted; and in which
- the special effect generation module increases the benefits provided to the controlled objects associated with the selectable objects selected by the selection operations of the player if the order of acceptance of the selection operation input for said selectable objects is comparatively late;
- wherein the screen generation module generates a game screen including a control area where the multiple selectable objects are disposed, and
- the acceptance module accepts the selection operation input on said selectable objects at the moment when the pointing location initially arrives at the location of a selectable object disposed in the control area, regardless of whether or not the pointing location has been located outside the control area, while the movement of the pointing location on the game screen is maintained by the player's operations.

* * * * *